US009626097B2

(12) United States Patent
Jeon et al.

(10) Patent No.: US 9,626,097 B2
(45) Date of Patent: Apr. 18, 2017

(54) METHOD AND SYSTEM FOR PROVIDING INFORMATION BASED ON CONTEXT, AND COMPUTER-READABLE RECORDING MEDIUM THEREOF

(71) Applicant: Samsung Electronics Co., Ltd., Suwon-si, Gyeonggi-do (KR)

(72) Inventors: Hee-chul Jeon, Suwon-si (KR); Jung-ho Kim, Geumsan-gun (KR); Yong-gook Park, Yongin-si (KR); Seung-eok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 14/090,422

(22) Filed: Nov. 26, 2013

(65) Prior Publication Data

US 2014/0164943 A1 Jun. 12, 2014

(30) Foreign Application Priority Data

Dec. 7, 2012 (KR) .................. 10-2012-0142238

(51) Int. Cl.
*G06F 3/0481* (2013.01)
*G06F 3/0482* (2013.01)
*G06F 9/44* (2006.01)
*G06Q 10/10* (2012.01)
*G06F 3/0488* (2013.01)

(52) U.S. Cl.
CPC .......... *G06F 3/0488* (2013.01); *G06F 3/0482* (2013.01); *G06F 3/04817* (2013.01); *G06F 9/4443* (2013.01); *G06F 3/0481* (2013.01); *G06Q 10/10* (2013.01)

(58) Field of Classification Search
CPC ... G06F 3/0481–3/0482; G06F 9/4443; G06Q 10/10
See application file for complete search history.

(56) References Cited

U.S. PATENT DOCUMENTS

| | | | | |
|---|---|---|---|---|
| 6,567,104 | B1 * | 5/2003 | Andrew | G06F 9/4443 715/762 |
| 6,633,315 | B1 * | 10/2003 | Sobeski | G06F 9/4443 715/762 |
| 6,760,046 | B2 * | 7/2004 | l'Anson | G06F 17/3087 707/E17.11 |
| 8,370,062 | B1 * | 2/2013 | Starenky | H04W 4/025 340/3.3 |
| 8,843,853 | B1 * | 9/2014 | Smoak | G06F 3/0482 715/788 |

(Continued)

FOREIGN PATENT DOCUMENTS

KR 10-2007-0074037 A 7/2007

*Primary Examiner* — Eric J Bycer
(74) *Attorney, Agent, or Firm* — Jefferson IP Law, LLP

(57) ABSTRACT

A method and system for providing information that enables easier and quicker access to an item related to a context of a device, and a computer-readable recording medium thereof are provided. The method includes detecting a context of a device, and displaying at least one virtual space corresponding to the detected context on a screen of the device. The virtual space is a Graphic User Interface (GUI) that is configured to register the detected context and information related to at least one item.

41 Claims, 13 Drawing Sheets

(56) References Cited

U.S. PATENT DOCUMENTS

| | | | |
|---|---|---|---|
| 8,881,057 B2* | 11/2014 | Mori | H04M 1/72569 715/810 |
| 2003/0158855 A1* | 8/2003 | Farnham | G06F 3/0481 |
| 2004/0259598 A1* | 12/2004 | Wagner | G06F 3/04817 455/566 |
| 2004/0268364 A1* | 12/2004 | Faraj | G06F 3/0482 719/316 |
| 2005/0091408 A1 | 4/2005 | Parupudi et al. | |
| 2005/0097563 A1* | 5/2005 | Bidet | G06F 21/604 719/310 |
| 2005/0188174 A1* | 8/2005 | Guzak | G06F 17/30126 711/203 |
| 2006/0004705 A1* | 1/2006 | Horvitz | G06F 17/30867 |
| 2006/0020633 A1* | 1/2006 | Cho | G06F 9/5027 |
| 2007/0022380 A1 | 1/2007 | Swartz et al. | |
| 2007/0082707 A1* | 4/2007 | Flynt | G06F 3/0481 455/564 |
| 2007/0298843 A1 | 12/2007 | Kwon | |
| 2008/0005679 A1* | 1/2008 | Rimas-Ribikauskas | G01C 21/3688 715/745 |
| 2009/0157632 A1 | 6/2009 | Ryu et al. | |
| 2010/0031194 A1* | 2/2010 | Kawaguchi | G06F 9/445 715/810 |
| 2010/0257196 A1* | 10/2010 | Waters | G06F 9/4443 707/769 |
| 2010/0295789 A1* | 11/2010 | Shin | G06F 1/1626 345/168 |
| 2010/0317371 A1 | 12/2010 | Westerinen et al. | |
| 2011/0072492 A1* | 3/2011 | Mohler | G06F 3/04817 726/3 |
| 2012/0059780 A1 | 3/2012 | Kononen et al. | |
| 2012/0084692 A1* | 4/2012 | Bae | G06F 3/04817 715/769 |
| 2012/0096396 A1* | 4/2012 | Ording | G06F 9/4443 715/799 |
| 2012/0165076 A1* | 6/2012 | Yu | G06F 3/0481 455/566 |
| 2012/0311485 A1* | 12/2012 | Caliendo, Jr. | G09G 5/14 715/784 |
| 2013/0050119 A1* | 2/2013 | Nemoto | G06F 3/0488 345/173 |
| 2013/0117263 A1* | 5/2013 | Lukose | G06F 17/30286 707/736 |

\* cited by examiner

METHOD AND SYSTEM FOR PROVIDING INFORMATION BASED ON CONTEXT, AND COMPUTER-READABLE RECORDING MEDIUM THEREOF

CROSS-REFERENCE TO RELATED APPLICATION(S)

This application claims the benefit under 35 U.S.C. §119 (a) of a Korean patent application filed on Dec. 7, 2012 in the Korean Intellectual Property Office and assigned Serial No. 10-2012-0142238, the entire disclosure of which is hereby incorporated by reference.

TECHNICAL FIELD

The present disclosure relates to providing information based on a context. More particularly, the present disclosure relates to providing information based on a context of a device.

BACKGROUND

As mobile devices, such as smartphones, are becoming smarter, items capable of being used by users based on devices are increasing. The items may include applications, services, and content.

However, in order to use items related to a context of the device, user has to search device for the items one by one. Therefore, there is required a technology for enabling a user to more easily and quickly access items related to a context of device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure include methods and systems for providing information that enables easier and quicker access to an item related to a context of a device, and a non-transitory computer-readable recording medium thereof.

Another aspect of the present disclosure is to provide methods and systems for providing information that enables easier and quicker access to an item related to position information of a device, and a computer-readable recording medium thereof.

Another aspect of the present disclosure is to provide methods and systems for registering information that enables easier and quicker access to an item related to a context of a device, and a computer-readable recording medium thereof.

Additional aspects will be set forth in part in the description which follows and, in part, will be apparent from the description, or may be learned by practice of the presented embodiments.

In accordance with one or more embodiments of the present disclosure, a method of providing information based on a context of a device is provided. The method includes detecting the context of the device, and displaying a virtual space corresponding to the context on a screen of the device, wherein the virtual space is a Graphic User Interface (GUI) that is configured to register information related to at least one application corresponding to the detected context.

The context may include at least one of time information and position information.

The displaying of the virtual space may include displaying the virtual space as a virtual page of a first screen of the device or displaying the virtual space in a predetermined display region of a predetermined page of the first screen. The first screen may include a home screen.

An index of the virtual page of the first screen may be displayed differently from an index of another page on the first screen.

The method may further include displaying a list including information related to the at least one application, and selecting at least one piece of information from the displayed list, and registering the selected information in the virtual space such that the selected information is displayed in the virtual space.

The information related to the application may include a shortcut icon of an application, and the registering the information related to the application in the virtual space may include linking the shortcut icon with the detected context prior to storage in the virtual space.

The method may further include, when the context of the device changes, making the virtual space disappear from the screen displayed in the device and storing information about the virtual space in the device.

The method may further include, when the context of the device changes, changing the displayed virtual space into another virtual space corresponding to the changed context.

The method may further include executing an application in response to an execution request regarding the information included in the virtual space.

The method may further include deleting information related to at least one application from the virtual space in response to a deletion request.

The method may further include receiving information about the virtual space from an external device.

The information related to the at least one application may include information in information about a virtual space received from the external device, and the information related to at least one application included in the virtual space registered by the device.

In the virtual space of the device, the information related to the at least one application received from the external device may be displayed differently from the information related to the at least one application registered by the device.

The method may further include at least one of: disregarding the information related to the at least one application received from the external device, when the information related to at least one application is identical to information related to at least one pre-registered in the virtual space, and displaying information indicating that the information related to at least one application is registered by the device and the external device.

The information related to the at least one application may include information related to the at least one application included in information about a virtual space received from an external device, and, in the virtual space corresponding to the context on a screen of the device, among the information related to the at least one application received from the external device, information related to an application set in the device may be displayed differently from information related to an application that is not set in the device.

The displaying the virtual space on the screen of the device may include displaying text information representing the context of the device.

The method may further include transmitting information about the virtual space to an external device connected to the device.

The information related to the at least one application may include one of a shortcut icon of an application, an application open command, an application execution command, an application start command, application access information, and application link information.

The virtual space further may include information related to at least one multimedia content corresponding to the detected context or information related to at least one service corresponding to the detected context.

The virtual space further may include information related to at least one item in a type different from the at least one application, and the at least one item may correspond to the detected context.

The information related to at least one item may include at least one of information related to multimedia and information related to service.

In accordance with one or more embodiments of the present disclosure, a method of providing information based on a context of a device is provided. The method includes detecting a context of a device, and displaying a virtual space corresponding to the detected context on a screen of the device, wherein the virtual space is a GUI that is configured to register information related to at least one item corresponding to the detected context.

In accordance with one or more embodiments of the present disclosure, a method of providing information based on a context of a device is provided. The method includes detecting the context of the device, creating a virtual space corresponding to the detected context, executing at least one item by the device, receiving a registration request signal in the virtual space, and registering information related to the at least one executed item in the virtual space.

In accordance with one or more embodiments of the present disclosure, a device is provided. The device includes a context detector configured to detect a context, a storage unit configured to store a program for displaying a virtual space corresponding to the detected context and at least one application, a touch screen configured to display the virtual space and to receive input information, and a processor configured to provide a user interface based on the touch screen and execute the program for displaying the virtual space, wherein the virtual space is a GUI that is configured to register information related to at least one application corresponding to the detected context.

In accordance with one or more embodiments of the present disclosure, a device is provided. The device includes a context detector configured to detect a context, a storage unit configured to store a program for displaying a virtual space corresponding to the detected context and at least one item, a touch screen configured to display the virtual space and to receive input information, and a processor configured to provide a user interface based on the touch screen, to create the virtual space, and to register information related to at least one item in the virtual space when a registration request signal is received through the touch screen during execution of the at least one item.

In accordance with one or more embodiments of the present disclosure, a non-transitory computer-readable recording medium stores one or more programs including instructions for executing the above method of providing information based on a context of a device is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description of the embodiments taken in conjunction with the accompanying drawings, in which.

Throughout the drawings, like reference numerals will be understood to refer to like parts, components, and structures.

DETAILED DESCRIPTION

Figure 1:
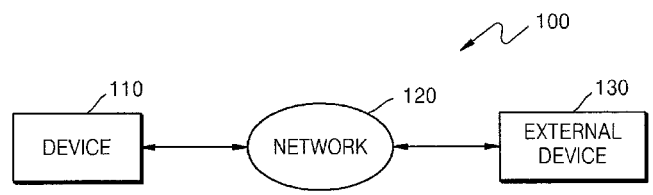
FIG. 1 is a block diagram of a system for providing information based on a context of a device according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present disclosure may include various embodiments and modifications, and embodiments are illustrated in the drawings and will be described below in detail. However, it will be understood that the present disclosure is not limited to the embodiments and includes all modifications, equivalents, and substitutions falling within the spirit and scope of the present disclosure. In the following description, detailed descriptions of well-known functions or configurations will be omitted since they would unnecessarily obscure the subject matters of the present disclosure.

Although terms such as "first" and "second" may be used herein to describe various elements or components, these elements or components should not be limited by these terms. These terms are only used to distinguish one element or component from another element or component.

The terms used herein are for the purpose of describing embodiments only and are not intended to be limiting of the present disclosure. As the terms used herein, so far as possible, widely-used general terms are selected in consideration of functions in the present disclosure; however, these terms may vary according to the intentions of those of ordinary skill in the art, the precedents, or the appearance of new technology. Also, in some cases, there may be terms that are optionally selected by the applicant, and the meanings thereof will be described in detail in the corresponding portions of the description of the present disclosure. Therefore, the terms used herein are not simple terms and should be defined based on the meanings thereof and the overall description of the present disclosure.

It is to be understood that the singular forms "a", "an", and "the" include plural referents unless the context clearly indicates otherwise. Thus, for example, reference to "a component surface" includes reference to one or more of such surfaces.

As used herein, the term "and/or" includes any and all combinations of one or more of the associated listed items. Expressions such as "at least one of," when preceding a list of elements, modify the entire list of elements and do not modify the individual elements of the list.

An item of a device that is mentioned throughout the specification may include an application, content, and a service related to a context of a device, as described below, but it is not limited thereto.

(1) An application, content, and a service that are frequently used by the user in a previous context identical to a current context of the device.

(2) An application, content, and a service that are accessible or executable by using information related to at least one item that is registered in a virtual space by the user in a previous context identical to a current context of the device.

(3) An application, content, and a service that are recommended by an external device in a previous context identical to a current context of the device.

(4) An application, content, and a service that are accessible or executable by using information related to item that is registered in a virtual space of an external device in a previous context identical to a current context of the device.

When the context of the device is based on position information and the current context of the device is a place A, the previous context may be a place A at a time previous to a current time. The current context of the device will be described later in detail in operation S201 of FIG. 2. The current context of the device may be referred to as the context of the device.

The content and the service may be referred to as items in a type different from an application. The application and the service may also be referred to as items in a type different from the content. The application and content may also be referred to as items in a type different from the service. This is because the application, content and service may be defined as being different types. For example, a camera application may be defined as being included in the application, a picture may be defined as being included in the content, and an N-screen service may be defined as being included in the service. However, an item corresponding to the context of the device may be defined as an application and content. This is because there are some applications that are referred to as services. Since the content may include various types of content, the content may be referred to as multimedia content.

The information related to item may include information related to an application, information related to content, and information related to a service that are set in the device, but is not limited thereto.

The information related to an application may include one of a shortcut icon of an application, an application open command, an application execution command, an application start command, application access information, and application link information, but it is not limited thereto. The application access information and the application link information may be defined as storage position information or Uniform Resource Locator (URL) information of an application. Therefore, the application access information and the application link information may be identical information.

The information related to an application may be referred to as a Graphic User Interface (GUI) or display information based on the following information:

(1) Thumbnail Representing Application;
(2) Text Information Representing Application;
(3) Icon Representing Application Type;
(4) Application Execution Icon; and
(5) URL Shortcut Information.

The information related to content and the information related to service may be defined like the information related to the application. Some services may be managed like the application. For example, an e-mail service may be referred to as an e-mail application. The service may include, for example, an advertisement service and a payment service, but it is not limited thereto.

Input information is user input information, which may include touch-based input information. The touch-based input information may include a user request, a user selection (e.g., selection of one among pieces of displayed information related to an application), and a user command (e.g., deletion command based on displayed information related to an application), but it is not limited thereto.

A touch-based input may depend on a touch-based user gesture. The touch-based user gesture may include, for example, a tap (or touch), a long tap (or long touch), a touch and hold, a touch and drag, a double tap, a drag, panning, a flick, a drag and drop, a sweep, and a swipe, but it is not limited thereto.

An input is not limited to the touch-based user gesture. For example, the input may be defined as a motion-based input or a vision-based input.

The motion-based input may be based on a user gesture based on the motion of the device applied by the user (e.g., device shaking and device tapping). For example, a user gesture of tapping the device two times or inclining the device toward a display position of a virtual space, which will be described in relation to embodiments later below, may be set as a registration request input for information related to an application selected in the virtual space.

The vision-based input may be based on a user gesture that is recognized by analyzing an input image acquired by a camera without contact to the device. For example, a spatial gesture of holding up a V sign with an index finger and a middle finger may be set as a deletion request input for information related to an application included in the virtual space.

Hereinafter, various embodiments of the present disclosure will be described in detail with reference to the attached drawings. In the following description, like reference numerals denote like elements, and redundant descriptions thereof will be omitted.

FIG. 1 is a block diagram of a system for providing information based on a context of a device according to an embodiment of the present disclosure.

Referring to FIG. 1, a system 100 for providing information may include a device 110, a network 120, and an external device 130.

Examples of the device 110 may include smartphones, smart TeleVisions (TVs), Personal Computers (PCs), desktop PCs, notebook computers, smart boards, tablets, mobile devices, handheld devices, handheld computers, media players, electronic book (e-book) terminals, Personal Digital Assistants (PDAs), digital cameras capable of inputting a touch-based user gesture, and digital Consumer Electronics (CE) devices (e.g., devices capable of inputting a user gesture based on a touch and an image display), but it is not limited thereto.

According to an embodiment, the device 110 may create a virtual space corresponding to a current context of the device 110 regardless of the external device 130, display the virtual space on a screen of the device 110 and register information related to an item corresponding to the current context in the virtual space. That is, the device 110 may operate with reference to FIG. 2.

Figure 2:
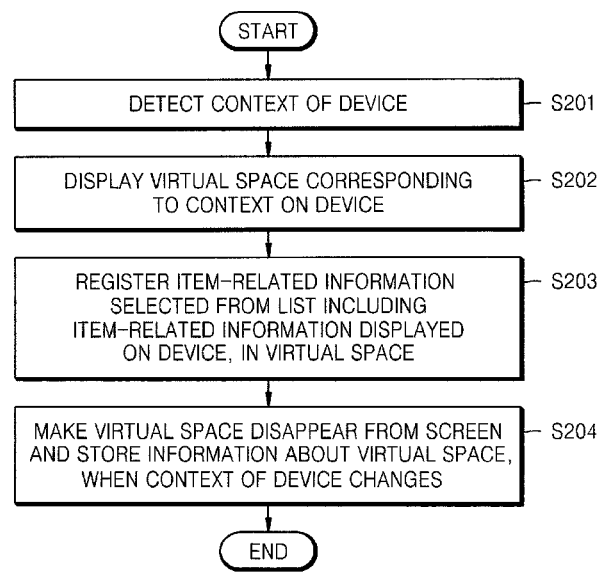
FIG. 2 is a flowchart illustrating a method for providing information based on a context of a device according to an embodiment of the present disclosure.

FIG. 2 is a flowchart illustrating a method of providing information based on a context of a device according to an embodiment of the present disclosure.

Referring to FIG. 2, the device 110 creates and displays a virtual space corresponding to a context of the device 110 regardless of the external device 130, registers information related to an item corresponding to the context in the virtual space, and makes the virtual space disappear from a screen of the device 110 when the context of the device 110 changes.

In operation S201, the device 110 detects a context. The context may include position information of the device 110, time information, use history information of a user, a spatial context of the device 110, a physical context of the user of the device 110, and environmental information of the device 110, but it is not limited thereto. When the context of the device 110 is a current context of the device 110, the position information of the device 110 includes current position information and the time information of the device 110 includes current time information.

The position information of the device 110 may include, for example, name information, such as home, a coffee shop, a name of a place, a name of a building, and an address based on physical positions, but it is not limited thereto. The spatial context of the device 110 may include, for example, information based on a position, movement direction, and movement speed of the device 110, but it is not limited thereto. The physical context of the device 110 may include, for example, information based on a pulse, blood pressure, body temperature, and voice of the user, but it is not limited thereto. The environmental context of the device 110 may include, for example, information based on the surrounding temperature, the surrounding humidity, the surrounding illumination, and the surrounding noise of the device 110, but it is not limited thereto.

In order to detect the context of the device 110, the device 110 may include various sensors. For example, when the context of the device 110 is based on position information, the device 110 may detect current position information by using an acceleration sensor, a geomagnetic sensor, and a gyro sensor.

Also, when the context of the device 110 is based on position information, the device 110 may detect current position information of the device 110 by using beacon signal-based technology using Radio Frequency (RF), ultrasonic position recognition technology, position recognition technology using a Wireless Fidelity (WiFi) signal, ZigBee® position recognition technology, and Global Positioning System (GPS) signal-based technology. In order to detect the current position information of the device 110 by using the above technologies, the device 110 may include the suitable sensors.

In operation S202, the device 110 displays at least one virtual space corresponding to the detected context. The virtual space is created according to the context of the device 110.

For example, when the context of the device 110 is determined to be a place A, the device 110 creates a virtual space corresponding to the place A and displays the virtual space on the screen of the device 110. To this end, the device 110 may store Table 1 below. Table 1 shows an example in which a virtual space is set according to a current context based on a named place. The current context of Table 1 may be redefined as a context. Table 1 may be stored in the external device 130 through the network 120, and may be provided to the device 110 in response to the request of the device 110.

TABLE 1

| Current Context | Virtual Space |
| --- | --- |
| Place A | Virtual Space 1 |
| Place B | Virtual Space 2 |
| Place C | Virtual Space 3 |
| Place D | Virtual Space 4 |
| . | . |
| . | . |
| . | . |

The virtual space may be set such that different virtual spaces are created according to the following various combinations; however, the embodiment is not limited thereto. For example, the virtual spaces may be:

(1) Based on Position;
(2) Based on Position and Time;
(3) Based on Position and Date;
(4) Based on Time and Date;
(5) Based on Time, Position, and Date;
(6) Based on Time, Place, and Environment (e.g., a surrounding temperature, a surrounding humidity, a surrounding illumination, and a surrounding noise of the device 110);
(7) Based on Position and Use History;
(8) Based on Time, Position, and Physical Context (e.g., the pulse, blood pressure, body temperature, and voice of the user of the device 110); or
(9) Based on Spatial Context of the device 110 (e.g., the position, movement direction, and movement speed of the device 110).

Figure 3:
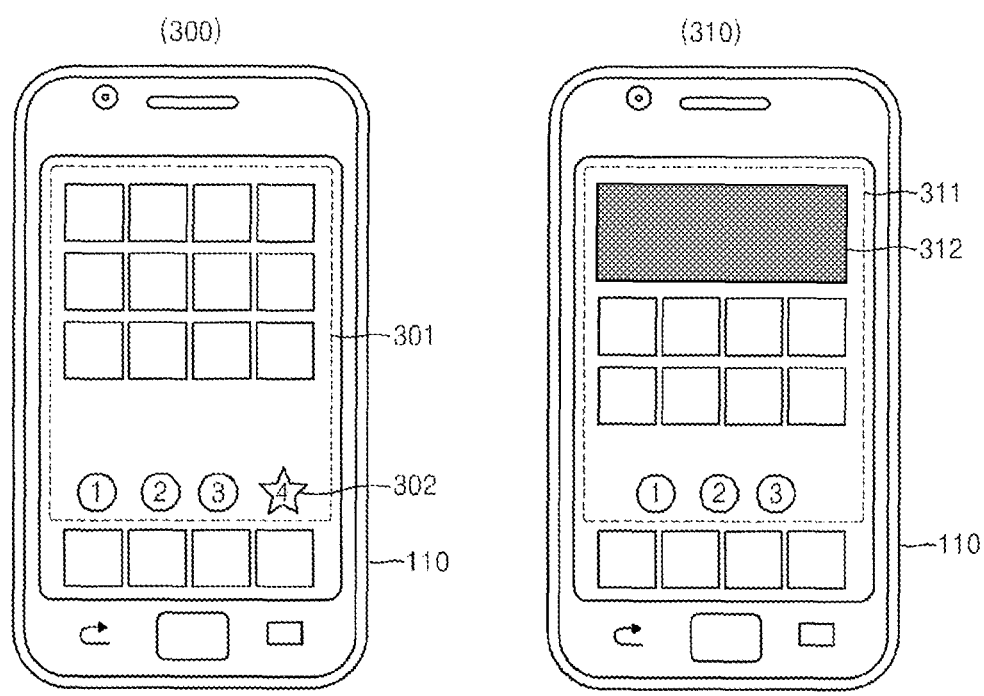
FIG. 3 is a diagram illustrating an example of displaying a virtual space according to an embodiment of the present disclosure.

FIG. 3 is a diagram illustrating an example of displaying a virtual space according to an embodiment of the present disclosure.

Referring to FIG. 3, a screen 300 corresponds to a case where a virtual space is created and displayed as a fourth page of a home screen or a launcher. Therefore, the fourth page may be referred to as a virtual page. When a number of items to be included in the virtual page goes beyond a reference value, the device may create and display a plurality of virtual pages. For example, when two virtual pages are created and displayed as illustrated in the screen 300 of FIG. 3, a fourth page and a fifth page (not illustrated in the screen 300 of FIG. 3) are created and displayed as a virtual page. The reference value may be determined according to a number of items that may be included in one virtual page. For example, a number of items that may be included in one virtual page is up to 25, the reference value may be set to 25, but is limited thereto. When a number of items to be included in the virtual page goes beyond the reference value, the device may reduce a display size of information related to the item to be display on the virtual page, and display information related to items that exceed the reference value on the virtual page.

As illustrated in the screen 300 of FIG. 3, the virtual page is not limited to the last page. That is, the virtual page may be created and displayed as a first page or a predetermined page. When the first page is to be set as a virtual page in the home screen, the virtual page may include a launcher program.

Also, the home screen may be referred to as a first screen. The first screen is a screen that is first displayed in the device 110 when the device 110 is powered on or an operation mode of the device 110 converts from a standby mode to an active mode. Therefore, the virtual page may be referred to as a virtual page of the first screen.

The device 110 displays an index 302 of the virtual page differently from an index of non-virtual page of the home screen. For example, as illustrated in the screen 300 of FIG. 3, the index of non-virtual page is displayed as including numerical information in a circle, while the index of the virtual page is displayed as including numerical information in a star. Accordingly, the user may intuitively recognize the virtual page.

The device 110 may be preset such that the index of the virtual page is displayed differently from the index of non-virtual page by using color information, size information, animation information, or character information.

A screen 310 of FIG. 3 corresponds to a case where a virtual space is displayed in a predetermined display region of a predetermined page. That is, the screen 310 of FIG. 3 corresponds to a case where the virtual space is displayed in a display region 312 located at a top portion of a first page 311 of the home screen. Since the screen 310 of FIG. 3 is displayed the virtual space in a different color than another display region (or non-virtual space) of the first page 311, the user may intuitively recognize that the virtual space is created. As illustrated in the first page 311 of FIG. 3, the virtual space may be displayed in another empty display region of the first page 311, in another region of another page, or in the same display region of each page of the home screen.

The virtual space is a GUI element that is configured to register information related to an application, content, and a service that may be executed by the device 110. However, for convenience of description, related information registered in the virtual space will be referred to as information related to an application. Therefore, in the following description, information related to an application may be understood as information related to an item, such as information related to content or information related to a service.

When created first according to the context of the device 110, the virtual space may be an empty space that does not include any information related to an application, as illustrated in the display region 312 of FIG. 3. Also, the virtual space may be referred to as a GUI element that is displayed in a predetermined display region of a predetermined page.

Referring back to FIG. 2, in operation S203, the device 110 may display a list including information related to an application and may register information related to an application, which is selected from the displayed list, in the virtual space. When the information related to an application includes a shortcut icon of an application, registering the information related to an application corresponding to the detected context of the device 110 in the virtual space may mean linking the shortcut icon to the detected context and storing the linking information between the shortcut icon and the detected context in the device 110. Accordingly, the shortcut icon is displayed in the virtual space corresponding to the detected context of the device 110. When the virtual space is displayed in the device 110, the information related to an application linked to the detected context may be temporarily stored.

FIGS. 4, 5, 6, and 7 are diagrams illustrating examples of screens for providing information based on a context of a device according to an embodiment of the present disclosure.

Figure 4:
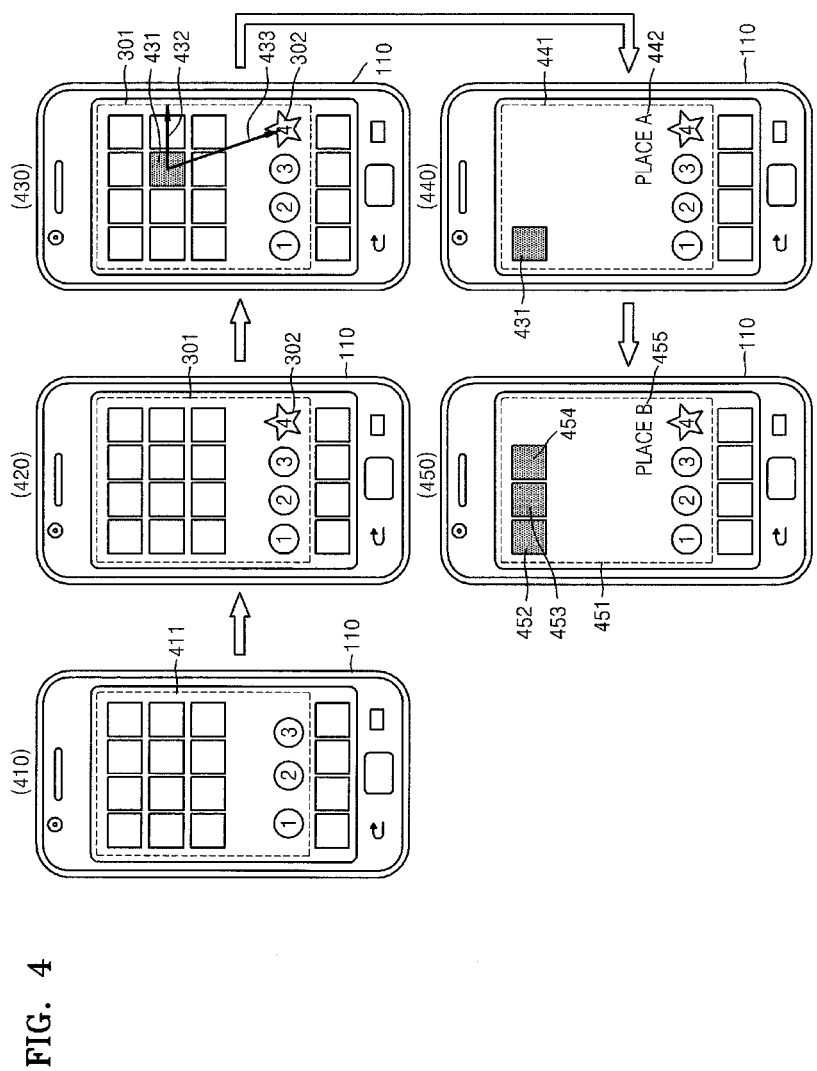
FIGS. 4, 5, 6, and 7 are diagrams illustrating examples of screens for providing information based on a context of a device according to an embodiment of the present disclosure.

Referring to FIG. 4, when the device 110 displays a screen 410 including a first page 411 of a home screen, if a virtual page is created according to the context of the device 110, the screen 410 of the device 110 changes into a screen 420 that displays a first page 301 including an index 302 of the virtual page. In the screen 420, icons included in the first page 301 are the information related to an application described above. The first page 301 may be displayed so as to include information related to an application arranged as tiles as shown in FIG. 4. However, the first page 301 may be displayed so as to include information related to an application arranged in a list. The information related to an application arranged as tiles or the information related to an application arranged in a list may be referred to as a list regarding the information related to an application.

When a user input of selecting one shortcut icon (or one piece of application-related information) 431 from the list regarding the information related to an application arranged in the tile-type is received and a touch-and-drag on the selected shortcut icon 431 in the direction of the virtual page is detected as represented by an arrow 432 or a touch-and-drag on the selected shortcut icon 431 toward a display point of an index 302 of the virtual page is detected as represented by an arrow 433, the device 110 registers the selected shortcut icon 431 in the virtual page such that the selected shortcut icon 431 is displayed on the virtual page. The registration of the selected shortcut icon 431 in the virtual page may be performed based on a copy function. Accordingly, the selected icon 431 may be displayed on the virtual page and the first page 301 of the home screen.

As illustrated in a screen 430, when information related to an application is registered in the virtual page and then a user input representing a move to the virtual page is received, the screen of the device 110 changes from the screen 430 to a screen 440. The user input representing a move to the virtual page may include a touch on the index of the virtual page and a user gesture representing moving a screen (e.g., scrolling), but it is not limited thereto.

A virtual page 441 may include information related to the application 431 registered in the screen 430, and text information 442 (e.g., place A) indicating the context of the device 110, but it is not limited thereto. The text information 442 indicating the context of the device 110 may include name information, such as home, a coffee shop, a name of a place, a name of a building, and an address based on a physical position, but it is not limited thereto. For example, the text information 442 may include a variety of information according to virtual space classification criteria provided. The text information indicating the above context may not be displayed on the virtual page 441.

In addition to the information related to the application 431 registered in the screen 430, the information displayed in the virtual page 441 may further include at least one of information related to a pre-registered application or information related to an application received from the external device 130.

Figure 5:
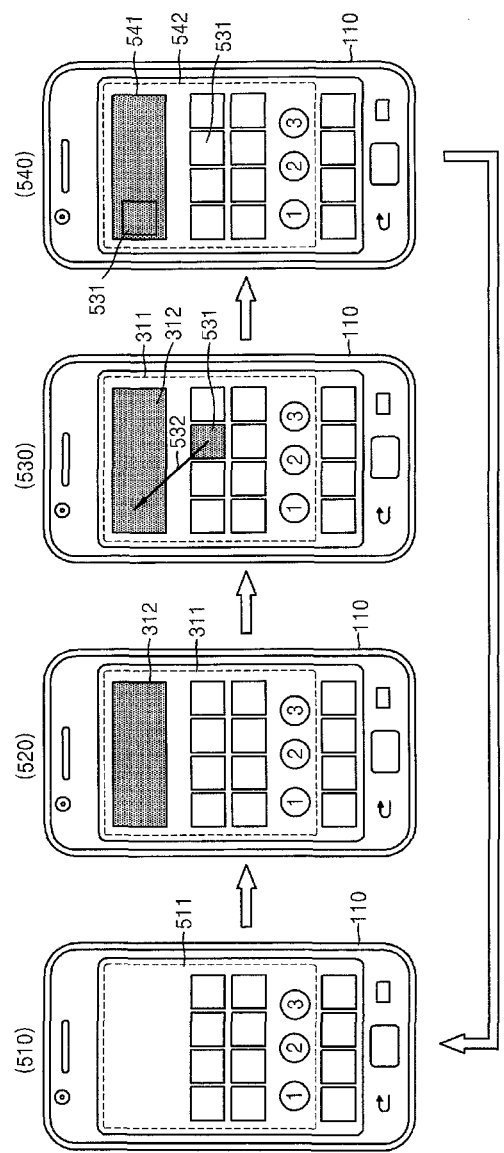

Referring to FIG. 5, the device 110 displays a screen 510 of FIG. 5 including a first page 511 (or a first screen) of the home screen, which does not include related information in the virtual space as illustrated in the screen 410 of FIG. 4. When the context of the device 110 is detected and a virtual space is created by the device 110, the device 110 changes the screen 510 into a screen 520 displaying a first page 311 including a virtual space 312 as illustrated in the screen 420 of FIG. 4.

When a signal indicating a selection of an icon 531 is received in the first page 311 and a signal indicating dragging of the selected icon 531 to the virtual space 312 is detected, a screen 530 of the device 110 changes into a screen 540 including a first page 542 including a virtual space 541 including the selected icon 531.

Referring back to FIG. 2, in operation S204, when the context changes, the device 110 makes the virtual space (or the index of the virtual space) disappear from the home screen and stores information about the virtual space therein.

That is, referring to screen 440 of FIG. 4 or the screen 540 of FIG. 5, if it is determined that the context of the device 110 changes, the device 110 may change the displayed screen from the screen 440 to the screen 410 or from the screen 540 to the screen 510, but is not limited thereto.

Figure 6:
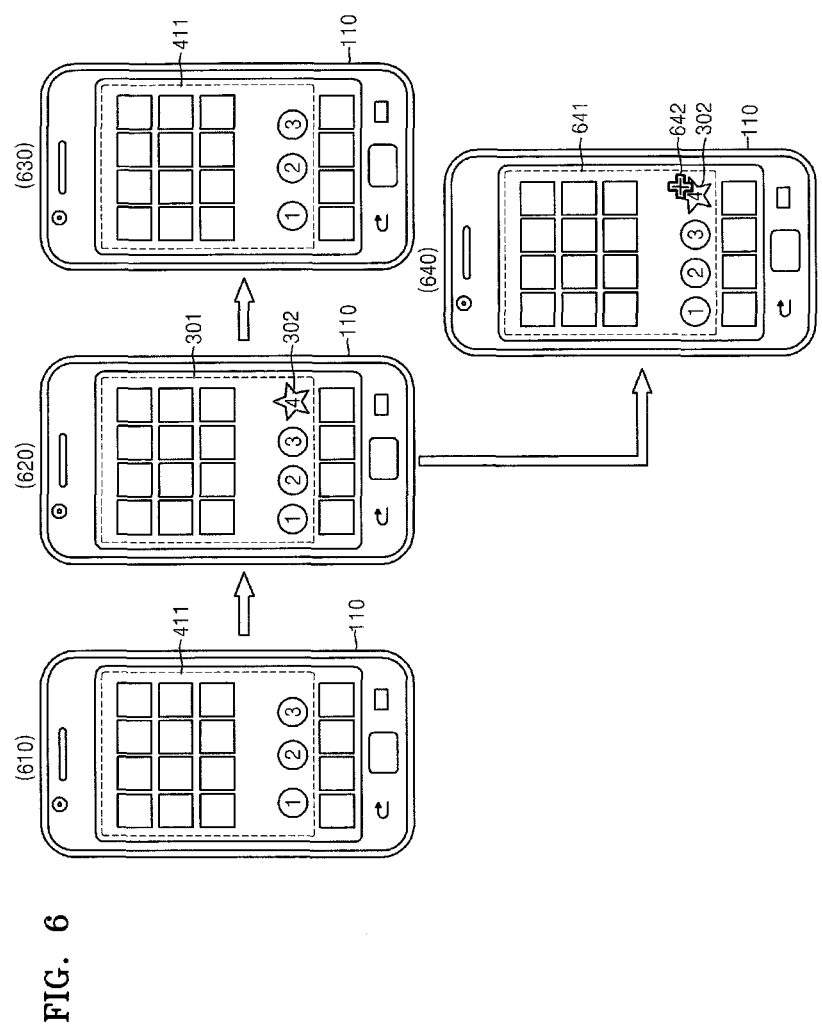

Referring to FIG. 6, the device 110 displays screen 610 including the first page 411 of the home screen when the virtual page is not created by the device 110. In this case, when the virtual page is created by the device 110, the screen 610 displayed in the device 110 changes into a screen 620 displaying a first page 301 including an index 302 of the virtual page.

When the screen 620 is displayed, if it is recognized that the context of the device 110 changes, the device 110 changes the displayed screen 620 into a screen 630 including the first page 411 from which the index 302 of the virtual page is removed. In this case, information about the virtual page is stored in the device 110.

Referring back to FIG. 2, operation S204 may be modified in such a manner that, when the context of the device 110 changes, information about the current virtual space is stored in the device 110 and a new virtual space corresponding to the changed context is displayed on a screen of the device 110.

For example, referring back to the screen 440 of FIG. 4, if the context of the device 110 changes and a virtual space corresponding to the changed context is created, the device 110 changes the screen 440 into a screen 450 displaying a new virtual page 451. The new virtual page 451 includes text information 455 (e.g., place B) indicating the contexts and information related to an application 452, 453 and 454. However, the information included in the virtual page 451 is not limited thereto. For example, the text information indicating the context of the virtual page 451 may not be displayed.

Also, when the context of the device 110 changes in a state where the virtual page is not opened and a new virtual page is created accordingly, the device 110 may display information indicating that the currently-created virtual page is a newly-created virtual page.

That is, referring to the screen 620 of FIG. 6, if the context of the device 110 changes as described above and a new virtual space 641 is created, the device 110 changes the screen 620 into the screen 640 and stores information about the previous virtual page therein. Referring to the screen 640, a symbol "+" 642 indicating a change of the virtual page 641 may be added to the index 302 of the virtual page such that the user may intuitively recognize the change of the virtual page. However, the symbol 642 indicating the change of the virtual page is not limited that illustrated in the screen 640 of FIG. 6.

The device 110 may determine a change of the context by detecting the context at predetermined periods and comparing the previously-detected context and the currently-detected context. For example, when the currently-detected context is different from the previously-detected context, the device 110 determines that the context of the device 110 has changed. An error margin or an error tolerance may be applied in determining whether the context has changed. For example, when the physical position of the device 110 is based on a room of a house, the error margin or the error tolerance may be applied such that the change of the context of the device 110 may be determined based on a room region based on an arrangement plan of a home.

Also, the flowchart of FIG. 2 may be modified in such a manner that an application is executed based on the information related to the application included in the virtual page or the information related to the application may be deleted. That is, the flowchart of FIG. 2 may add an operation to execute an application based on information related to the application 431 or that the information related to the application 431 may be deleted from the virtual page 441, when an execution request or a deletion request based on the information related to the application 431 is received when the virtual page 441 is displayed on the screen 440 of FIG. 4.

Figure 7:
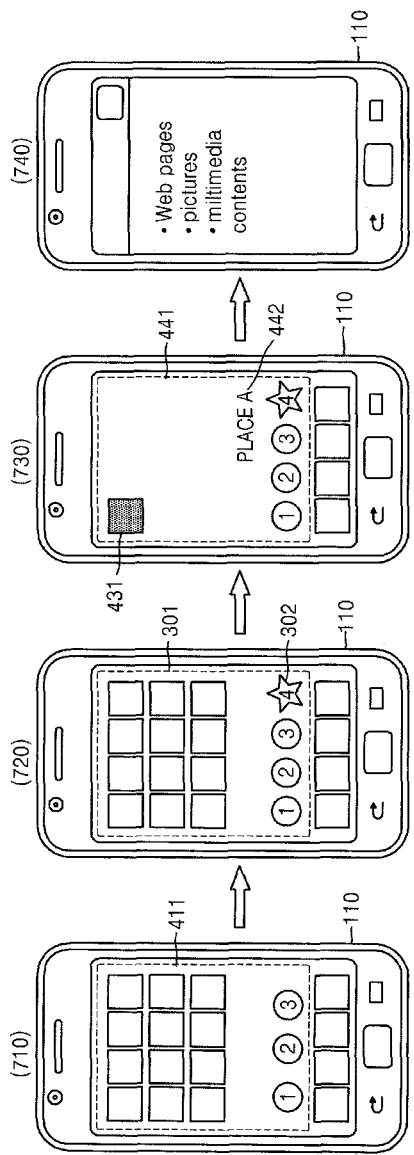

Referring to FIG. 7, the device 110 displays a screen 710 including a home screen prior to generation of a virtual space. When a virtual space is created by the device 110, the device 110 displays a screen 720 including a first page 301 of the home screen including an index 302 of a virtual page. When a request to move to the virtual page is received, the device 110 opens a virtual page 441 as shown in a screen 730. When an execution request based on the information related to the application 431 is received in the state where the virtual page 441 is opened, the device 110 executes an application as shown in a screen 740. A web page, a picture, and multimedia content illustrated in the screen 740 indicate that the execution of an item such as an application, content, or a service.

In this manner, the device 110 registers information related to at least one application set by the device 110 in the virtual page or the virtual space created dynamically according to the context, and provides a virtual page or a virtual space including registered information related to the application when a context identical to the context of the device 110 occurs in the future. The information related to the application included in the virtual page or the virtual space may be understood as recommended information linked to the context of the device 110. Accordingly, the user may easily and quickly recognize and use an application, content, and a service related to the context of the device 110.

The device 110 may provide the context to the external device 130 connected through the network 120 and may receive information about the virtual space from the external device 130 and display the same.

Figure 8:
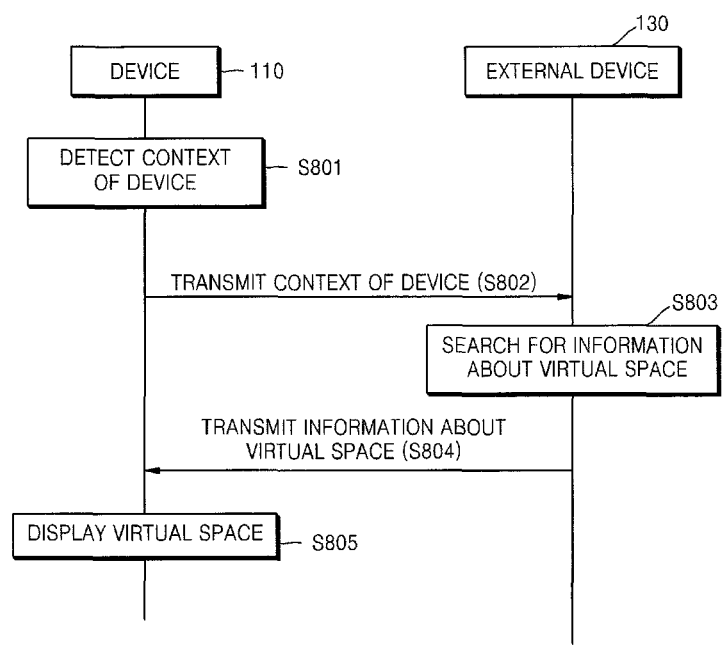
FIG. 8 is a flowchart illustrating a method for providing information based on a context of a device according to another embodiment of the present disclosure.

FIG. 8 is a flowchart illustrating a method of providing information based on a context of a device according to another embodiment of the present disclosure.

Referring to FIG. 8, the operation flow of FIG. 8 may be performed when there is no virtual space stored in the device 110. That is, after detection of the context of the device 110, when information about the virtual space is not present in the device 110 or the virtual space is not created by the device 110, information about the virtual space may be received from the external device 130 as illustrated in FIG. 8. However, without determining whether the virtual space is present in the device 110 or whether the virtual space is created by the device 110, when detecting the context of the device 110, the device 110 may request information about the virtual space from the external device 130.

In operation S801, the device 110 detects a context. The detection of the context of the device 110 may be performed in the same manner as in operation S201 of FIG. 2. When detecting the context of the device 110, the device 110 transmits the detected context to the external device 130 through the network 120 in operation S802.

In operation S803, the external device 130 searches for information about the virtual space based on the received context. To this end, the external device 130 pre-stores information about the virtual space based on various contexts. Therefore, the external device 130 may include a server providing information about the virtual space, a cloud server, or a communication device such as the device 110 that creates a virtual space according to the current context and stores information related to an application registered by a user of the external device 130, but it is not limited thereto. The external device 130 may search for information about the virtual space based on information stored in another external device (not illustrated) that is connected to the external device 130.

When the information about the virtual space corresponding to the context of the device 110 is found, the external device 130 transmits the found information about the virtual space to the device 110 in operation S804. Accordingly, the device 110 displays the virtual space based on the received information about the virtual space in operation S805.

The virtual space may be displayed as illustrated in at least one of FIGS. 2 to 7. However, when displaying the information related to the application included in the virtual space, the device 110 may display the information related to the application such that the user may intuitively recognize whether the received information related to the application is not or is not set in the device 110 or.

Figure 9:
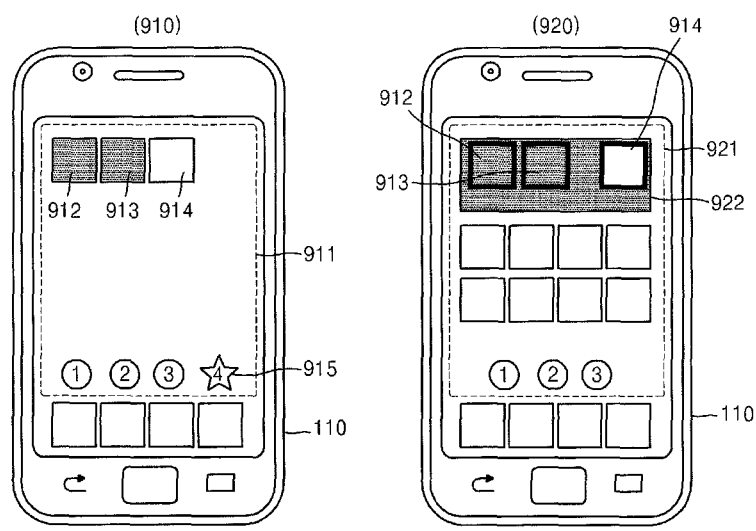
FIG. 9 illustrates an example screen for describing information related to item included in a virtual space according to another embodiment of the present disclosure.

FIG. 9 illustrates an example screen for describing information related to item included in a virtual space according to an embodiment of the present disclosure.

Referring to FIG. 9, the device 110 displays a screen 910 with virtual page 911 including information related to an application 912, 913 and 914. The information related to the application 912 and 913 is information related to an application that is set in the device 110. The information related to the application 914 is information related to an application that is not set in the device 110. The screen 910 is an example in which the information related to the application 912 and 913 is represented in a different color than the information related to the application 914. The information related to the application 912 and 913 may be displayed opaquely, and the information related to the application 914 may be displayed transparently.

A screen 920 of FIG. 9 corresponds to a case where the virtual space is displayed as illustrated in the screen 310 of FIG. 3. The screen 920 is an example in which a first page 921 including a virtual space 922 including information related to the application 912, 913 and 914 identical to the information related to the application 912, 913 and 914 included in the virtual page 911 of the screen 910 is displayed.

When the user desires to use the information related to the application 913, which is not set in the device 110, and a setting command based on the information related to the application 913 is input by the user, the device 110 downloads an application corresponding to the information related to the application 913 from the external device 130 through the network 120. The setting command based on the information related to the application 913 may include, for example, a touch-based user gesture such as a long touch, a double touch, a sweep, and a swipe, but it is not limited thereto.

However, instead of downloading the application from the external device 130, the device 110 may transmit an execution request to the external device 130, receive and display execution result of the external device 130 as if the application is executed by the device 110.

When the execution of the application is requested based on the information related to the application 912 and 913 illustrated in the screens 910 and 920, the device 110 may execute the corresponding application.

As illustrated in FIG. 8, the received information about the virtual space may be stored in the device 110 and then used when the same situation occurs next. When the stored virtual space is used, the device 110 may request information about the virtual space from the external device 130 in order to obtain information related to an application (information related to an additional application) other than the information related to the application registered in the virtual space stored in the device 110. In this case, the device 110 compares the information related to the application included in the information about the virtual space received from the external device 130 and the information related to the application included in the virtual space stored in the device 110, disregards information related to an identical application, and registers only information related to a non-identical application in the virtual space so that information related to the non-identical application is additionally displayed in the virtual space.

However, when registering the information related to the application received from the external device 130 in the virtual space, the device 110 compares the information related to the application pre-registered in the virtual space and the information related to the received application. From a result of the comparison, additional information (e.g., a predetermined symbol) may be attached to the information related to the application prior to display, or the information related to the application may be displayed differently from the information related to other application so as to be distinguishable so that the user may intuitively recognize that the information related to the identical application is information related to the application provided by both the device 110 and the external device 130.

Therefore, the information related to the application included in the virtual space may be displayed separately according to the following list, but is not limited thereto.

(1) Information related to an application that is registered by the device 110 (or information related to an application that is pre-registered in the virtual space stored in the device 110 based on the context of the device 110)

(2) Information related to an application that is registered by both the device 110 and the external device 130

(3) Information related to an application that is registered by the external device 130 and is set in the device 110

(4) Information related to an application that is registered by the external device 130 and is not set in the device 110

Figure 10:
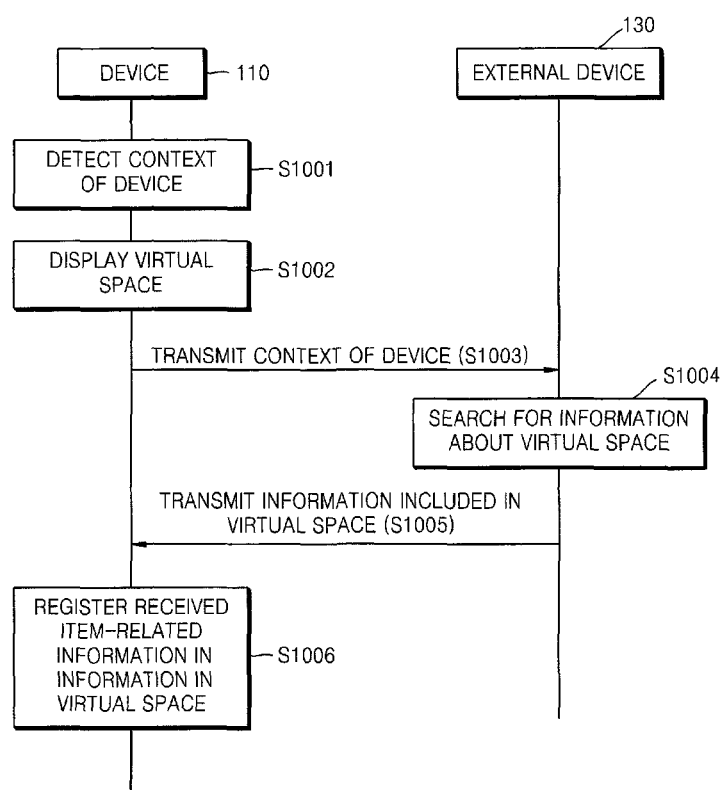
FIG. 10 is a flowchart illustrating a method for providing information based on a context of a device according to another embodiment of the present disclosure.

FIG. 10 is a flowchart illustrating a method of providing information based on a context of a device according to another embodiment of the present disclosure.

Referring to FIG. 10, by communicating with the external device 130, the device 110 may display the virtual space and register information related to an application.

In operation S1001, the device 110 detects a context. When a virtual space is created according to the detected context, the device 110 displays the created virtual space in operation S1002.

In operation S1003, the device 110 transmits the detected context of the device 110 to the external device 130. Accordingly, the external device 130 searches for information about the virtual space based on the received context of the device 110 in operation S1004. In response to finding the information about the virtual space, the external device 130 transmits the information about the found virtual space to the device 110 in operation S1005.

When receiving information about the virtual space from the external device 130, the device 110 registers the information related to an application included in the information about the virtual space in the virtual space that is currently displayed in operation S1006. Whenever registering the information related to an application received from the external device 130 in the virtual space, the device 110 may compare the received information related to an application with the pre-registered information related to an application and register the received information related to the application as described above.

Figure 11:
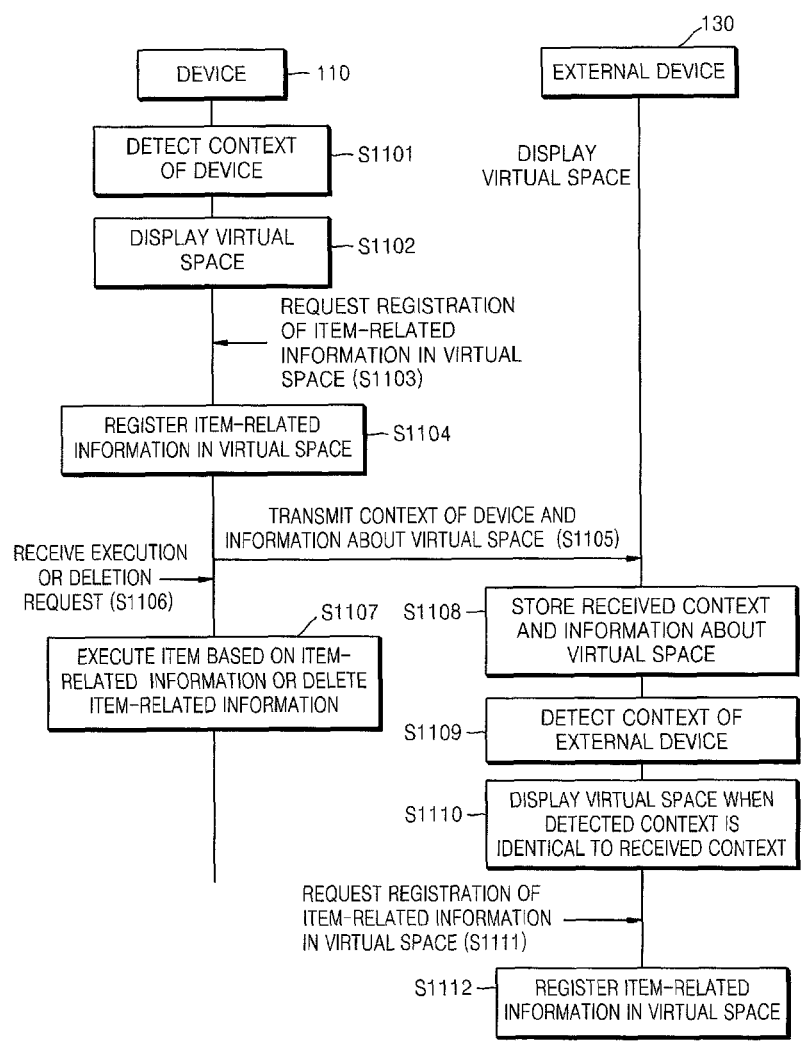
FIG. 11 is a flowchart illustrating a method for providing information based on a context of a device according to another embodiment of the present disclosure.

FIG. 11 is a flowchart illustrating a method of providing information based on a context of a device according to another embodiment of the present disclosure.

Referring to FIG. 11, a case where the device 110 transmits information about the virtual space to the external device 130 is illustrated.

In operation S1101, the device 110 detects a context. The device 110 displays the virtual space corresponding to the detected context of the device 110 therein in operation S1102. In this case, the virtual space may be displayed as illustrated in the screen 310 of FIG. 3, only the index of the virtual page may be displayed as illustrated in the screen 310, or an open virtual page may be displayed as illustrated in the screen 440 of FIG. 4.

When receiving a request for registering information related to at least one application in the virtual space based on a list including information related to an application described in relation to the above embodiments in operation S1103, the device 110 registers information related to the requested application in the virtual space in operation S1104. The information about the virtual space including the information related to the application registered by the device and the context of the device 110 are transmitted to the external device 130 in operation S1105.

The external device 130 stores the received context of the device 110 and the information about the virtual space in operation S1108. The external device 130 detects a context of the external device 130 in operation S1109. The detection of the context of the external device 130 may be performed in the same manner as the detection of the context of the device 1100 in S201 of FIG. 2.

When the detected context of the external device 130 is identical to the received context of the device 110, the external device 130 displays the virtual space based on the received information about the virtual space in operation S1110. When the registration of information related to a new application based on a list including the information related to at least one application, which may be displayed on a screen of the external device 130, in the displayed virtual space is requested in operation S1111, the external device 130 registers and displays the information related to the new application in the virtual space. The virtual space displayed in operation S1110 may be identical to the screen 300 of FIG. 3, the screen 310 of FIG. 3, or the screen 440 of FIG. 4, but is not limited thereto. Also, the external device 130 may delete the information related to the application included in the displayed virtual space or may execute an application based on the information related to the application.

When the device 110 receives a request for executing an application based on the information related to the application included in the virtual space or deleting the information related to an application in operation S1106, the device 110 executes the application or deletes the information related to the application in operation S1107.

Figure 12:
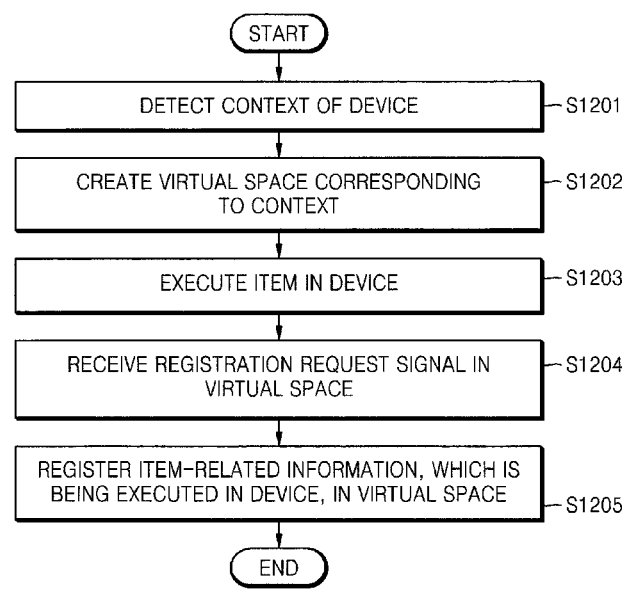
FIG. 12 is a flowchart illustrating a method for providing information based on a context of a device according to another embodiment of the present disclosure.

FIG. 12 is a flowchart illustrating a method of providing information based on a context of a device, according to another embodiment of the present disclosure.

Referring to FIG. 12, a case is illustrated where a currently-executed application is registered in the virtual space created according to the context of the device 110 during execution of the application.

In operation S1201, the device 110 detects a context. The detection of the context may be performed in the same manner as in operation S201 of FIG. 2.

In operation S1202, the device 110 creates a virtual space corresponding to the current context. In operation S1203, the device 110 executes an item, such as an application, content, or a service.

When receiving a registration request signal in the virtual space in operation S1204, the device 110 registers and displays information related to the executed application, content or service in the virtual space in operation S1205.

Figure 13:
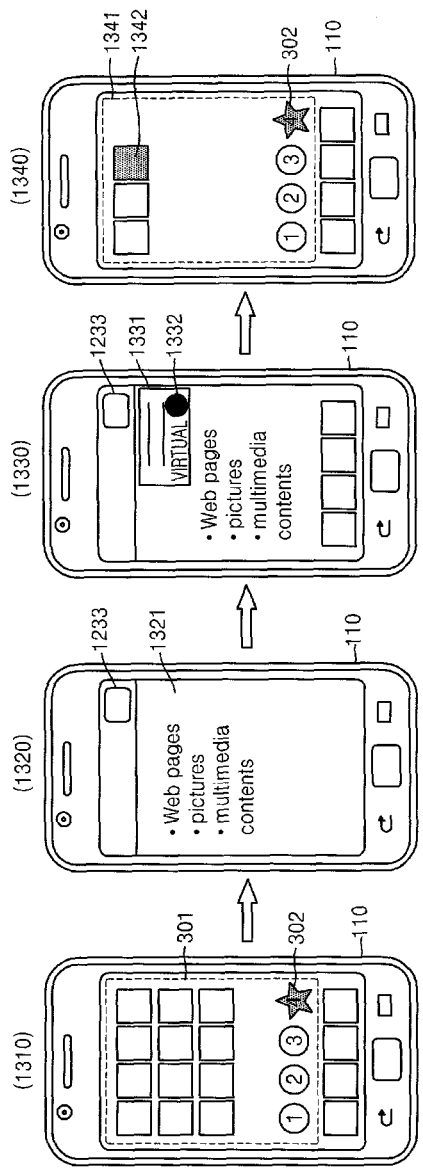
FIG. 13 is a diagram illustrating an example screen for describing the flowchart of FIG. 12 according to an embodiment of the present disclosure.

FIG. 13 is a diagram illustrating an example screen for describing the flowchart of FIG. 12 according to an embodiment of the present disclosure.

Referring to FIG. 13, when a virtual page is created in a screen 1310 by the device 110, a home screen including an index of the virtual page is displayed on a screen of the device 110, and then one of a web page, a picture, and multimedia content is executed based on an icon, the screen of the device 110 changes from the screen 1310 to a screen 1320. The screen executed based on the icon is not limited to the screen 1320 of FIG. 13.

When a shared button 1233 is selected in the screen 1320, the device 110 displays a pop-up window 1331 including a menu item of a lower layer in screen 1330. When a registration request item 1332 is included in a virtual page of the pop-up window 1331 and a selection on the registration request item 1332 is detected in the virtual page, the device 110 registers and displays information related to currently-executed application in the virtual page in the virtual page.

The device 110 may change a displayed screen 1330 into a screen 1340 including a virtual page 1341, and notify the user about the registration of information related to the new application 1342. The information related to the new application 1342 may be turned on for a predetermined period of time or may maintain a highlight state to distinguish the information related to the new application from the information related to the previous application, but is not limited thereto.

The network 120 of FIG. 1 may be configured based on wireless communication or wired communication. When the network 120 is configured based on wireless communication, the network 120 may include, for example, wireless networks such as a direct Wireless connection (e.g., WiFi Direct), ZigBee®, Bluetooth®, Infrared Data Association (IrDA), Radio Frequency Identification (RFID), Near Field Communication (NFC)-based communication, Wireless LAN (e.g., WiFi) passing through an AP, 3G/4G-based communication, Internet, Wireless Intranet, Wireless Telephone Network, and Ultra WideBand, but the present disclosure is not limited thereto. The network 120 based on wired communication may use one of schemes using power lines (e.g., home Phoneline Network Alliance (PNA)), schemes using power lines (e.g., HomePlug, LongWorks, and HNCP), schemes using Ethernet (e.g., IEEE 802.3), and structured wiring schemes, but is not limited thereto.

The external device 130 may be identical to the device 110 and may different such as a cloud server that may provide information about a virtual space based on a context customized for the user of the device 110, but is not limited thereto. The virtual space based on the context customized for the user may include, for example, a virtual space based on position information, in which the user desires to create a virtual space.

Figure 14:
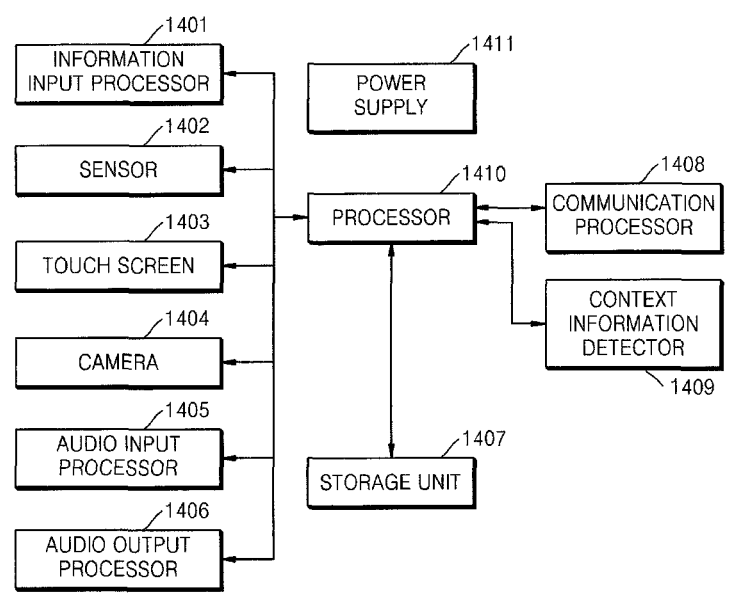
FIG. 14 is a block diagram of the device 110 illustrated in FIG. 1 according to an embodiment of the present disclosure.

FIG. 14 is a block diagram of the device 110 illustrated in FIG. 1 according to an embodiment of the present disclosure.

Referring to FIG. 14, the device 110 may include an information input processor 1401, a sensor 1402, a touch screen 1403, a camera 1404, an audio input processor 1405, an audio output processor 1406, a storage unit 1407, a communication processor 1408, a context detector 1409, a processor 1410, and a power supply 1411. The configuration of the device 110 is not limited to that illustrated in FIG. 14. That is, the device 110 may include more components than the components illustrated in FIG. 14, or may include less components. For example, the device 110 may not include the camera 1404.

The information input processor 1401 may input data for controlling an operation of the device 110 and information for requesting the execution of a method of providing information based on the context of the device 110 according to an embodiment of the present disclosure, but the input information is not limited thereto. The information input processor 1401 may include at least one of a keypad, a dome switch, a jog wheel, a jog switch, a HardWare (H/W) button, a hot key, and a touch panel, but it is not limited thereto.

The sensor 1402 detects the current state of the device 110, such as the position of the device 110, if a user contacts the device 110, orientation of the device 110, and acceleration/deceleration of the device 110 and then generates a sensing signal for controlling an operation of the device 110. The sensor 1402 may include a proximity sensor and a motion sensor. The sensor 1402 may generate a detection signal regarding a sensor-based user gesture.

The proximity sensor detects the presence of an object approaching a predetermined detection surface or an object located in the proximity thereof by using an electromagnetic force or infrared rays. Examples of proximity sensors may include transmission type photoelectric sensors, direct reflection type photoelectric sensors, mirror reflection type photoelectric sensors, high frequency oscillation type proximity sensors, electrostatic capacity type proximity sensors, magnetic type proximity sensors, and infrared proximity sensors.

The sensor 1402 may be included in the context detector 1409. The context detector 1409 detects a context of the device 110. The context detector 1409 may further include various sensors, such as an acceleration sensor, a geomagnetic sensor, and a gyro sensor, as described in relation to operation S201 of FIG. 2, and may be configured to detect various contexts described in relation to FIG. 2.

The touch screen 1403 may include a resistive (pressure-sensitive) touch screen or a capacitive touch screen, but it is not limited thereto. The touch screen 1403 may receive a user request, a user selection, or a user command based on a touch-based user gesture. As the touch-based user gesture, various touch-based user gestures may be defined by various combinations of a touch count, a touch pattern, a touch area, and a touch strength. However, the touch-based user gesture is not limited thereto.

The touch screen 1403 may include various sensors for detecting a proximity touch or a touch to the touch screen 1403. The sensor included in the touch screen 1403 may generate a sensing signal for the touch-based user gestures or patterns. A proximity sensor for the touch screen 1403 may be identical to a proximity sensor included in the sensor 1402.

An example of the sensor for detecting a touch to the touch screen 1403 may include a tactile sensor. The tactile sensor may detect a variety of information, such as the roughness of a contact surface, the hardness of a contact object, and the temperature of a contact point. The proximity sensor is a sensor that detects the presence of an object approaching a detection surface or an object located in the proximity thereof by using an electromagnetic force or infrared rays. Examples of proximity sensors may include transmission type photoelectric sensors, direct reflection type photoelectric sensors, mirror reflection type photoelectric sensors, high frequency oscillation type proximity sensors, electrostatic capacity type proximity sensors, magnetic type proximity sensors, and infrared proximity sensors.

A touch to the touch screen 1403 corresponds to a pointer touching a touch panel. A proximity touch to the touch screen 1403 corresponds to a case where a pointer approaches a touch panel within a predetermined distance without touching the touch panel. The point is a tool for touching or proximity-touching a predetermined portion of the touch screen 1403. Examples of the pointer may include a stylus pen and a finger, but it is not limited thereto.

The touch screen 1403 displays information processed by the device 110. For example, the touch screen 1403 may display a screen for responding to a user gesture or a touch pattern sensed through the sensors included in the touch screen 1403, control data or user input information input through the information input processor 1401, or a signal sensed through the sensor 1402.

In order to perform a method of providing information based on a context of a device according to an embodiment of the present disclosure, the touch screen 1403 transmits a user input indicating a selection of the information related to an application included in the displayed virtual page to the processor 1410. When a virtual space is created by the processor 1410, the touch screen 1403 displays the received virtual space.

The touch screen 1403 displays the screens illustrated above based on the control of the processor 1410, receives a touch-based input based on the displayed screen, and transmits the same to the processor 1410. The screen displayed on the touch screen 1403 may be referred to as User Interface (UI)-based feedback information on the input.

The touch screen 1403 may be referred to as an information input/output device. The screen displayed on the touchscreen 1403 may include a UI-based GUI screen.

The touch screen 1403 may include at least one of Liquid Crystal Display (LCD), Thin Film Transistor Liquid Crystal Display (TFT-LCD), Organic Light-Emitting Diode (OLED), flexible display, three-Dimensional (3D) display, and Active-Matrix Organic Light-Emitting Diode (AMO-LED), but it is not limited thereto. The touch screen 1403 may be referred to as a display. Two or more touch screens 1403 may be provided according to embodiments.

The camera 1404 processes an image frame such as a still image or a moving image obtained by an image sensor (or an optical sensor) in a video call mode or a photograph mode. The processed image frame may be displayed on the touch screen 1403. Accordingly, a spatial gesture, which is defined to perform a method of providing information based on a context of a device according to an embodiment of the present disclosure, may be recognized based on the image frame included in the still image of the moving image obtained by the camera 1404.

The image frame processed by the camera 1404 may be stored in the storage unit 1407 or may be transmitted through the communication processor 1408. Two or more cameras 1404 may be provided according to the configurations of the device 110. Also, the camera 1404 may be used as an input device for recognizing a spatial gesture of the user.

In a call mode, a recording mode, or a voice recognition mode, the audio input processor 1405 receives an external sound signal, converts the received sound signal into audio data, and transmits the audio data to the processor 1410. The audio input processor 1405 may include, for example, a microphone. The audio input processor 1405 may include various noise cancellation algorithms for canceling a noise that may be generated during the input of an external sound signal.

The sound signal input via the audio input processor 1405 may include user input for requesting the execution of a method of providing information based on a context of a device according to an embodiment of the present disclosure. When the sound signal is user input based on a spoken language, the sound signal may be referred to as a user input based on voice recognition. The external sound signal input through the audio input processor 1405 may be stored in the storage unit 1407 or may be transmitted via the communication processor 1408.

In a call mode or an audio play mode, the audio output processor 1406 outputs a sound signal or an audio signal that is received from the outside or read from the storage unit 1407. The audio output processor 1406 may include, for example, a speaker. When an audio signal is included in content that is reproduced, the audio output processor 1406 outputs an audio signal included in the reproduced content. The audio input processor 1405 and the audio output processor 1406 may be integrated as a headset.

The storage unit 1407 stores at least one program and/or an instruction set and resources that are executable in the processor 1410. The at least one program may include at least one program for executing a method of providing information based on a context of the device 110 according to an embodiment of the present disclosure, an operating system of the device 110, application programs related to various functions (or services) performed by the device 110, service programs, and programs for operating hardware components included in the device 110, but is not limited thereto.

The resources may include content that may be reproduced according to an embodiment of the present disclosure, information about the virtual space that may be provided according to the context detected by the device 110 as shown in Table 1, information related to at least one application included in the virtual space, and list information including the information related to the at least one application, but is not limited thereto.

Also, the resources may include user information of the device 110, information necessary to operate an application program set in the device 110, and information necessary to execute a program for operating the hardware components, but is not limited thereto.

The storage unit 1407 may include at least one type of storage medium among flash memory type, hard disk type, multimedia card micro type, card type memory (e.g., SD and XD memories), Read-Only Memory (ROM), Electronically Erasable Programmable Read-only Memory (EEPROM), Programmable Read-Only Memory (PROM), magnetic memory, and an optical disk.

The at least one program and/or instruction set stored in the storage unit 1407 may be divided into a plurality of modules according to functions. For example, the storage unit 1407 may include an operating system, a communication module, a graphic module, a GPS module, a UI module, a sensing module, a contact and motion module, a power supply module, and an application module, but the present disclosure is not limited thereto.

The application module may include a plurality of applications necessary to execute a method of providing information based on a context of the device 110 according to an embodiment of the present disclosure. The plurality of applications may include a launcher application. The launcher application may display a virtual space on a home screen as described in the various embodiments. For example, by the launcher application, the virtual space may be displayed as illustrated in the screen 300 of FIG. 3, or may be displayed as illustrated in the screen 310 of FIG. 3. However, the display pattern of the virtual space is not limited to the above embodiments.

The communication processor 1408 may communicate data with an external device through wireless networks such as Wireless Internet Communication, Wireless Intranet Communication, Wireless Telephone Network, Wireless LAN Communication, WiFi Communication, WiFi Direct, 3rd Generation (3G) Communication, 4th Generation (4G) communication such as Long Term Evolution (LTE), Bluetooth®, IrDA, RFID, UWB Communication, and Zig-Bee®; however, the present disclosure is not limited thereto.

The communication processor 1408 may include at least one of a broadcast reception module, a mobile communication module, a wireless Internet module, a wired Internet module, a NFC module, and a position information module, but it is not limited thereto.

The communication processor 1408 may further include a wired communication function for communicating data with the external device 130 through a wired network. The wired communication function may communicate data with an external device (not illustrated) by using a plug-and-play interface such as a Universal Serial Bus (USB) port (not illustrated).

The communication processor 1408 may be used to transmit data to the external device 130 and receive data from the external device 130, as illustrated in FIGS. 8, 10 and 11.

The power supply 1411 supplies power to the hardware components included in the device 110. The power supply 1411 includes one or more power supplies such as a battery and an AC power supply. The device 110 may not include the power supply 1411, and may include a connection unit (not illustrated) that is connectable to an external power supply (not illustrated). The connection unit may be configured based on at least one of wireless-type and wire-type.

The processor 1410 controls an overall operation of the device 110, and may be referred to as one or more processors. By using the various modules and the operating system stored in the storage unit 1407, the processor 1410 may control all of the information input processor 1401, the sensor 1402, the touchscreen 1403, the camera 1404, the audio input processor 1405, the audio output processor 1406, the storage unit 1407, the communication processor 1408, the context detector 1409, and the power supply unit 1411. Therefore, the processor 1410 may be referred to as a controller, a microprocessor, or a digital signal processor.

Also, by using the operating system and the UI module, the processor 1410 may provide a user interface by the information input processor 1401, the sensor 1402, the touchscreen 1403, the camera 1404, and the audio input processor 1405.

The processor 1410 may perform the operation flows illustrated in FIGS. 2, 8, 10, 11 and 12 by executing at least one program related to a method of providing information based on a context according to an embodiment of the present disclosure. The processor 1410 may read the program from the storage unit 1407 and execute the same, or may download the program from the external device 130 connected through the communication processor 1408 and execute the same. In this case, the external device 130 may be referred to as an application providing server or an application market server. As described above, the external device 130 may include a cloud server or a communication device around the device 110, but is not limited thereto. The processor 1410 may be understood as including an interface function unit between the processor 1410 and the various components in the device 110.

In the above embodiments, an example in which information related to an application is included in a virtual space has been described. However, the virtual space may further include information related to multimedia content or information related to at least one service corresponding to the context of the device 110. The information related to the multimedia content and the information related to the service may be referred to as information related to an item in a type different from the application as described above. Therefore, the virtual space according to an embodiment may include information related to different types of items corresponding to the context of the device 110. Also, the virtual space may include information related to a plurality of item (e.g., information related to a plurality of application or information related to a plurality of multimedia).

One or more program modules including instructions allowing a controller to implement the methods of providing information based on a context of a device and may be recorded as computer-readable codes on a non-transitory computer-readable recording medium. The non-transitory computer-readable recording medium may be any data storage device that may store data which may be thereafter read by a computer system. Examples of the computer-readable recording medium may include Read-Only Memory (ROM), Random-Access Memory (RAM), Compact Disc (CD)-ROMs, magnetic tapes, floppy disks, and optical data storage devices. The computer-readable recording medium may also be distributed over network-coupled computer systems so that the computer-readable code may be stored and executed in a distributed fashion.

It should be understood that the various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of providing information by a device, the method comprising:
    detecting location information of the device;
    registering first information in a location specific screen associated with the location information when the first information is selected or executed by using the device at a location associated with the location information; and
    when second information is received from an external device at the location associated with the location information and the second information is not identical to the first information, displaying, on a display of the device, a notification indicating that the second information is registered in the location specific screen.

2. The method of claim 1, further comprising detecting current time information,
    wherein the location specific screen corresponds to the detected current time information and the location information of the device.

3. The method of claim 1, further comprising
    displaying an index of the location specific screen,
    wherein the index of the location specific screen is displayed differently from an index of another screen.

4. The method of claim 1, further comprising displaying the location specific screen in a predetermined display region of the display of the device.

5. The method of claim 1, wherein the registering of the first information comprises:
    displaying, on the display of the device, a list comprising information related to at least one application;
    selecting at least one piece of information from the displayed list; and
    registering the selected information in the location specific screen such that the selected information is included in the location specific screen.

6. The method of claim 5,
    wherein the information related to the at least one application comprises a shortcut icon of the application, and
    wherein the registering of the selected information in the location specific screen comprises:
        linking the shortcut icon with the location information of the device and information about the location specific screen, and
        storing the linked information in the device.

7. The method of claim 1, further comprising, when the location information of the device changes, making the location specific screen disappear from the display of the device and storing information about the location specific screen in the device.

8. The method of claim 1, further comprising, when the location information of the device changes, displaying another location specific screen corresponding to the changed location information.

9. The method of claim 1, further comprising executing an application in response to an execution request regarding the information included in the location specific screen.

10. The method of claim 1, further comprising deleting at least one piece of information from the location specific screen in response to a deletion request.

11. The method of claim 1, wherein the first information and the second information comprises at least one piece of information related to at least one application.

12. The method of claim 1, further comprising
disregarding the second information received from the external device when the second information received from the external device is identical to the first information.

13. The method of claim 1, further comprising displaying text information representing the location information of the device.

14. The method of claim 1, further comprising transmitting information about the location specific screen to the external device.

15. The method of claim 1, wherein the first information comprises one of a shortcut icon of the item, an item open command, an item execution command, an item start command, item access information, and item link information.

16. The method of claim 1, wherein the location specific screen further comprises information related to at least one multimedia content corresponding to the location information.

17. The method of claim 1, wherein the location specific screen further comprises information related to at least one service corresponding to the location information.

18. A device comprising:
a location information detector configured to detect location information of the device;
a storage configured to store a program for displaying a location specific screen corresponding to the detected location information and at least one application;
a touch screen configured to display the location specific screen and to receive input information;
a transceiver configured to communicate with an external device: and
a processor configured to:
provide a user interface based on the touch screen,
detect the location information of the device by using the location information detector,
register first information in the location specific screen associated with the detected location information when the first information is selected or executed by using the device at a location associated with the location information, and
when second information is received from the external device via the transceiver at the location associated with the location information and the second information is not identical to the first information, control the touch screen to display, on the touch screen, a notification indicating that the second information is registered in the location specific screen.

19. The device of claim 18,
wherein the processor is further configured to detect current time information, and
wherein the location specific screen corresponds to the current time information and the location information of the device.

20. The device of claim 18, wherein the processor is further configured to:
display, on the touch screen, a list comprising information related to at least one application,
select the at least one piece of information from the displayed list, and
register the selected information in the location specific screen such that the selected information is included in the location specific screen.

21. The device of claim 18, wherein, when the location information changes, the processor is further configured to:
make the location specific screen disappear, and
store information about the location specific screen.

22. The device of claim 18, wherein, when the location information changes, the processor is further configured to change the location specific screen into another location specific screen corresponding to the changed location information.

23. The device of claim 18, wherein the processor is further configured to execute an application in response to an execution request based on information related to an application included in the location specific screen.

24. The device of claim 18, wherein the processor is further configured to delete information related to at least one application from the location specific screen in response to a deletion request.

25. The device of claim 18,
wherein the processor is further configured to transmit information about the location specific screen to the external device through the transceiver.

26. The device of claim 18, wherein the first information comprises one of a shortcut icon of the item, an item open command, an item execution command, an item start command, item access information, and item link information.

27. The device of claim 18, wherein the location specific screen further comprises information related to at least one multimedia content corresponding to the location information.

28. The device of claim 18, wherein the location specific screen further comprises information related to at least one of service corresponding to the location information.

29. A non-transitory computer-readable recording medium storing one or more programs comprising instructions for executing a method of providing information by a device, the method comprising:
detecting location information of the device;
registering first information in a location specific screen associated with the location information when the first information is selected or executed by using the device at a location associated with the location information; and
when second information is received from an external device at the location associated with the location information and the second information is not identical to the first information, displaying, on a display of the device, a notification indicating that the second information is registered in the location specific screen.

30. A method of providing information by a device, the method comprising:
detecting location information of the device;
creating a location specific screen at a location associated with the location information;

executing an item by the device at the location associated with the location information;

receiving a registration request signal in the location specific screen at the location associated with the location information;

registering first information related to the item in the location specific screen at the location associated with the location information; and when second information is received from an external device at the location associated with the location information and the second information is not identical to the first information, displaying, on a display of the device, a notification indicating that the second information is registered in the location specific screen.

31. The method of claim 30, wherein the registration request signal in the location specific screen is received by using a menu button displayed in the display of the device.

32. The method of claim 31, wherein the first information comprises one of a shortcut icon of the item, an item open command, an item execution command, an item start command, item access information, and item link information.

33. The method of claim 30, wherein the creating of the location specific screen comprises:

transmitting the location information to the external device; and receiving information about the location specific screen from the external device and creating the location specific screen based on the location specific screen information.

34. The method of claim 30, further comprising transmitting the location information and information about the location specific screen.

35. The method of claim 30, wherein the item comprises an application.

36. The method of claim 30, wherein the item comprises multimedia content.

37. The method of claim 30, wherein the item comprises a service.

38. The method of claim 30, wherein the item comprises at least one of an application and an item having a different type than the application.

39. The method of claim 30, wherein the item comprises at least one of an application, multimedia content, and a service.

40. A device comprising:

a location information detector configured to detect location information of the device;

a storage configured to store a program for displaying a location specific screen corresponding to the location information and an item;

a touch screen configured to display the location specific screen and to receive input information;

a transceiver configured to communicate with an external device; and a processor configured to:

provide a user interface based on the touch screen, detect the location information of the device by using the location information detector, create the location specific screen corresponding to the detected location information at a location associated with the location information, execute the item by the device at the location associated with the location information, receive a registration request signal in the location specific screen at the location associated with the location information, register first information related to the item in the location specific screen at the location associated with the location information, and when second information is received from the external device at the location associated with the location information and the second information is not identical to the first information, display, on the touch screen, a notification indicating that the second information is registered in the location specific screen.

41. A non-transitory computer-readable recording medium storing one or more programs comprising instructions for executing a method of providing information by a device, the method comprising:

detecting location information of the device;

creating a location specific screen at a location associated with the location information;

executing an item by the device at the location associated with the location information;

receiving a registration request signal in the location specific screen at the location associated with the location information;

registering first information related to the item in the location specific screen at the location associated with the location information; and when second information is received from an external device at the location associated with the location information and the second information is not identical to the first information, displaying, on a display of the device, a notification indicating that the second information is registered in the location specific screen.

* * * * *